April 13, 1937.                    E. ROSS                    2,076,919
                       INTERMITTENT FILM MOVEMENT
                 Filed Sept. 21, 1934        2 Sheets-Sheet 1

INVENTOR.
ERNEST ROSS
BY
ATTORNEY.

April 13, 1937.  E. ROSS  2,076,919
INTERMITTENT FILM MOVEMENT
Filed Sept. 21, 1934   2 Sheets-Sheet 2

INVENTOR.
ERNEST ROSS
BY
ATTORNEY.

Patented Apr. 13, 1937

2,076,919

UNITED STATES PATENT OFFICE 2,076,919

INTERMITTENT FILM MOVEMENT

Ernest Ross, Richmond Hill, N. Y., assignor to United Research Corporation, Long Island City, N. Y., a corporation of Delaware Application September 21, 1934, Serial No. 744,947

2 Claims. (Cl. 88—18.4)

The invention relates to an intermittent film movement for traversing or pulling down picture film through a picture gate.

An object of the invention is to provide a movement which is simple in construction, automatically lubricated during operation, reversible in its film feeding action, and which will pull down the film once for each complete revolution of the driving shaft.

The manner in which these and other objects are accomplished will be described in connection with the accompanying drawings wherein.

Figure 1:
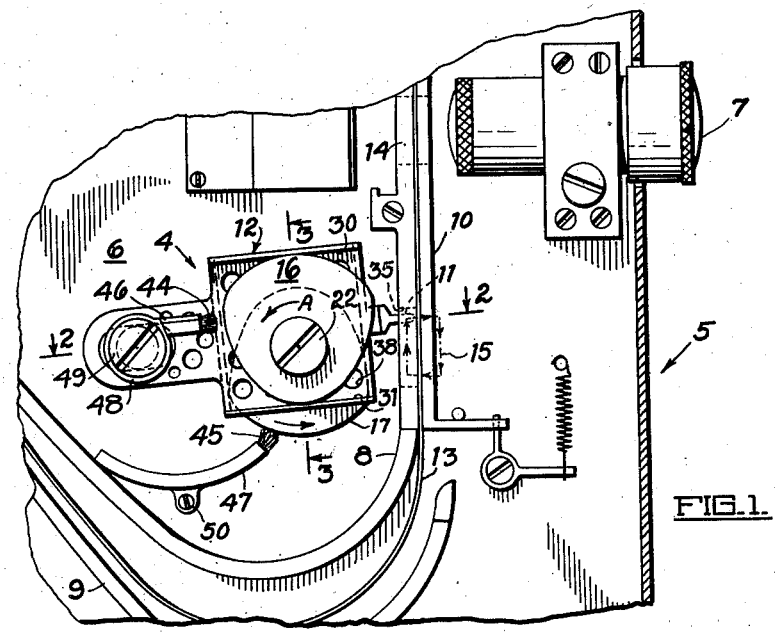
Fig. 1 is an elevational view through part of a moving picture projector showing a preferred form of my invention.

More particularly describing the invention as herein illustrated, the intermittent film advancing mechanism generally indicated at 4, is shown as being mounted in a motion picture projector 4, having a main wall section 6, an objective lens 7, film guides 8 and 9, and a pressure pad 10.

Figure 3:
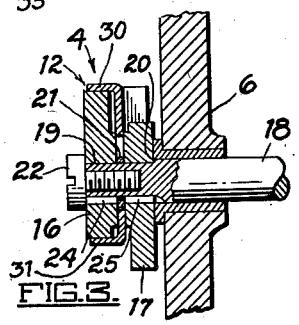
Fig. 3 is a sectional elevation view taken in a plane represented by line 3—3 in Fig. 1.

The film engaging claws 11 which are mounted on the forward part of a shuttle fork 12 are required to be moved in two different directions substantially at right angles to each other. That is, they must be moved horizontally, in and out of engagement with the film and they must also be moved vertically to feed the film 13 past the film gate aperture 14 as is shown by the rectangular path indicated in dotted lines at 15 in Fig. 1. To accomplish this result, I employ a pair of diametrically disposed cams 16 and 17 which are both rigidly mounted on a common drive shaft 18 in any suitable manner. In this form of my invention, I show the shaft 18 as having a reduced end portion 19 forming a shoulder 20 against which the cam 17 abuts, (Fig. 3). A spacer ring 21 is placed between the cams 16 and 17, the assembly being held together by a cap screw 22 fastened in a threaded hole in the end of the shaft 18. Keys 24 and 25 are employed to prevent the cams from rotating on the shaft 18.

The cam 16 effects the up and down motion of the claws while the cam 17 effects the back and forth motion.

Figure 4:
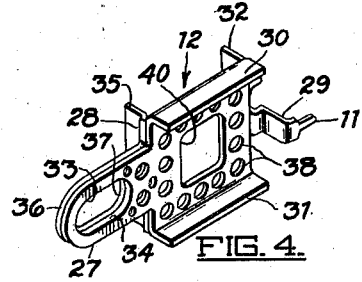
Fig. 4 is a perspective view of a preferred form of shuttle fork.

Because of the high speed and intermittent motion of the shuttle fork 12, comparatively heavy inertia forces are set up and it is therefore essential that the shuttle fork be constructed in the lightest possible manner. I therefore prefer to form it out of thin sheet metal sections welded or otherwise fastened together as shown in Fig. 4. In this particular form, the shuttle fork 12 is constructed of three sections 27, 28, and 29. The main section 27 has formed thereon two horizontal guide flanges or cam followers 30 and 31 and also a front vertical guide flange or cam follower 32 bent back from the main portion. A rearwardly extending end portion 33 is provided with an elongated slot 34. The section 28 comprises the rear vertical guide flange or cam follower 35 and an extending rear portion 36 having a slot 37 which registers with the slot 34 in the section 27. By uniting the two sections 27 and 28 together a larger bearing portion is thereby produced in the slot 34. The section 29 is substantially U shaped in construction and has the film engaging claws 11 and 11' formed on the ends thereof. The rear portion of the section 29 is welded or otherwise suitably fastened to the vertical flange 32 formed on the forward part of the section 27. To further lighten the construction, holes 38 are provided in the sides of the shuttle fork.

The shuttle fork 12 is mounted between the cams 16 and 17 and has an enlarged aperture 40 therein to allow for horizontal and vertical movement without interference with the space ring 21 on the shaft 18.

As will be seen, the horizontal guide flanges or cam followers 30 and 31 will be engaged by the cam 16 while the vertical guide flanges or cam followers 32 and 35 will be engaged by the cam 17.

The slot 34 provided at the rear of the shuttle fork 12 is adapted to oscillate and slide on a bearing portion 41 formed on the end of a stud 43 which I show as being integrally formed with the wall 6.

The claws 11 and 11' of the shuttle fork 12 move through a pair of vertical slots 34 and 35 provided in the vertical portion of the guide 8.

For the purpose of lubricating the cams 15 and 16, I provide oil wicks 44 and 45 mounted in holders 46 and 47, respectively. The holder 46 is shown as having an enlarged rear portion 48 which is clamped to the end of the stud 43 by the cap screw 49. The holder 47 is mounted directly on the wall portion 6 by a screw 50. It will be noted that the cam followers 30 and 31 are circumferentially discontinuous around their associated cam 16, and the same applies to the other cam and its followers. This has the advantage of making it possible to use oil wicks referred to above, to contact with the high points of their respective cams at a place where such discontinuity exists, namely between the separated portions of the followers 30 and 31, and also between the separated portions of the followers 32 and 35. This insures quieter operation and longer life without repair, than would otherwise be the case.

Figure 5:
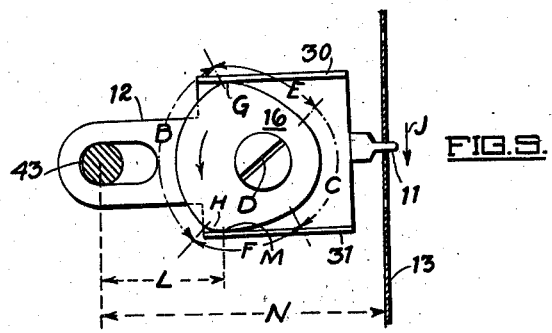
Fig. 5 is a diagrammatic view showing the cam and shuttle fork in position to feed the film.

It is obviously desirable in moving the film in an intermittent motion, to do so with the least amount of jerking or jarring of the claws 11, 11', as this is detrimental, not only to the film, but also to the film feeding mechanism itself. I therefore prefer to form the surfaces of the cams in such a way as to produce a so-called "uniformly accelerated motion" of the claws 11, 11', and consequently, the film 13. Referring to Fig. 5, it will be seen that cam 16' (both cams having the same shape) is composed of two diametrically disposed arcs B and C of different radii which are concentric about the center D and which are connected by two diametrically disposed eccentric curves E and F. The intersection of the curve E and arc B form a point or lobe G while the intersection of the curve F and arc B form a like lobe H.

Figure 2:
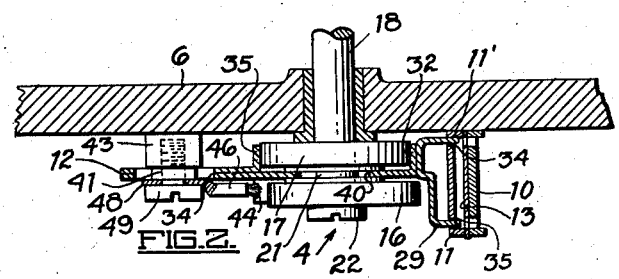
Fig. 2 is a plan sectional view taken in a plane represented by line 2—2 in Fig. 1.
Figure 6:
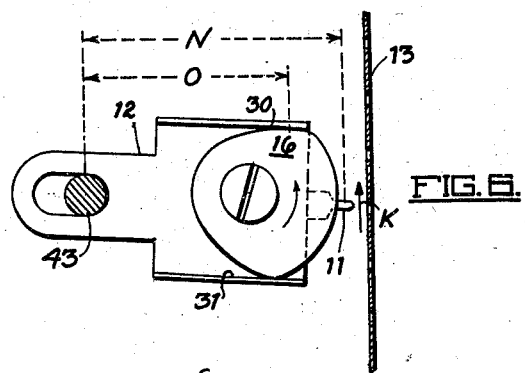
Fig. 6 is a view similar to that of Fig. 5 but with the cam and shuttle fork in a different position.

In order to move the film in a downward path on the feeding stroke of the claws 11, 11', the shaft 18, carrying the cams 16 and 17, is rotated in a counterclockwise direction as indicated by the arrow A in Fig. 2. An important feature of this invention is that the "dwell" of the picture, that is, the length of time the picture is held before the film gate aperture, is of greater duration than the time required to move the film, one step, or in other words, the distance of one picture frame. How I accomplish this will be more clearly understood by reference to Figs. 5 and 6 in which Fig. 5 shows the claws 11, 11', starting in a downward feeding motion in the direction of the arrow J. Fig. 6 shows the claws 11, 11', starting upward on the return stroke as shown by the arrow K. In Fig. 5, it will be seen that the distance L between the pivot point and the point of contact M of the cam 16 is much smaller in proportion to the distance N than the corresponding distance O in Fig. 6. Therefore, it will be seen that while the cam rotates at the same speed throughout the cycle, the claws 11, 11', will be given a faster downward movement than upward. The direction of rotation of shaft 18 may be reversed, however, to feed the film 13 in the opposite direction through the gate 10.

For this movement, in and out, transversely to the gate 10, the claws 11, 11', are constrained to move in a straight line as the distance from the center of rotation D to the working points on the opposite side of cam 16 does not vary during this period. Therefore, the claws 11, 11', move transversely in and out of film engagement at the same speed.

Figure 7:
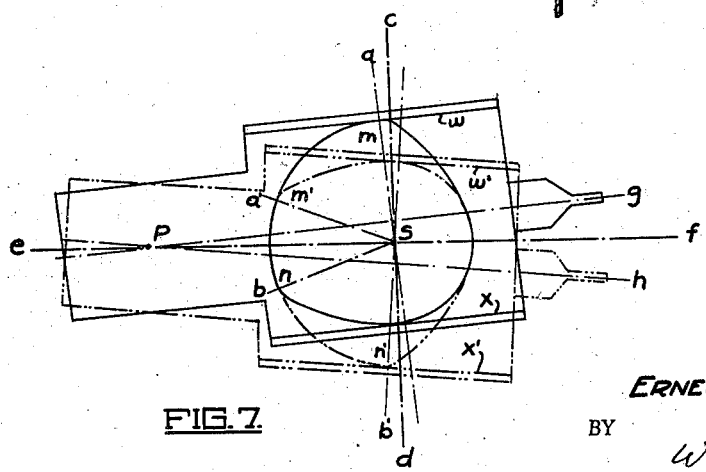
Fig. 7 is a diagrammatic side elevation corresponding to Figs. 5 and 6 illustrating fast pulldown and slow return of the claw.

More specifically describing the action of the film engaging claws reference is had to Fig. 7 wherein:

$gph$ = oscillatory angle of claw = $10°$
$asb$ = angle between $m$ and $n$ — centers of radii = $106°$
$asc = b'sd = \frac{1}{2}gph$
$psa$ = angle of $m$ with respect to horizontal center line $ef$ at beginning of stroke.

When $m$ moves to $m'$, $n$ moves to $n'$. At beginning of pull down $m$ is in contact with face of cam arm W at such a point that a perpendicular to face W extended from the point of tangency will intercept the center S. Likewise, at the end of pull down $n'$ is in contact with face of cam arm X' at such a point that a perpendicular to face X' extended from the point of tangency will also intercept center S. Therefore, the angle through which the cam rotates for complete pull-down when rotating counter clockwise is:

$$asa' = bsb' = 180° - (asb + gph) = 180° - (106° + 10°) = 180° - 116° = 64°.$$

If the cam rotates clockwise it will rotate through an angle of $$180° - (asb - gph) = 180° - (106° - 10°) = 180° - 96° = 84°.$$

The difference between the two being 2 $gph$ or $20°$.

Having thus described the invention, what is claimed as new and desired to secure by Letters Patent, is:

I claim:

1. Intermittent film movement comprising a rotatable drive shaft, a pair of cams carried thereby, each of said cams comprising opposed concentric surfaces of different radii conjoined with eccentric curved portions, all diametrical dimensions across each of said cams being substantially the same, a unitary shuttle fork member having a wall and two pairs of parallel cam followers thereon, one pair of said cam followers being displaced 90° with respect to the other pair, each pair of said cam followers embracing one of said cams, said wall extending between said cams, said cams being angularly displaced substantially 180° on said shaft, and means for pivotally and slidably supporting said shuttle fork member.

2. A unitary shuttle fork member comprising a thin rectangular body portion, said portion having a shaft receiving aperture centrally disposed therein, a pair of parallel cam follower flanges extending from one side of said member at opposite edges of said rectangular body portion, a second pair of parallel cam follower flanges extending from the other side of said member at the other opposite edges of said rectangular body portion, said aperture being smaller than the distance between the operating surfaces of said respective flanges so that a section of said body portion extends within the space defined by said flanges, a shuttle fork at one end of said body portion, and a lug having an elongated aperture at the other end of said body portion.

ERNEST ROSS.